US012809704B2

(12) United States Patent
Dande et al.

(10) Patent No.: US 12,809,704 B2
(45) Date of Patent: Nov. 24, 2026

(54) SYSTEM AND METHOD FOR DETECTING REAL-TIME ANOMALIES IN TRANSMISSION PATH OF RESOURCES WITHIN AN ENTITY NETWORK VIA DNA COMPUTING

(71) Applicant: BANK OF AMERICA CORPORATION, Charlotte, NC (US)

(72) Inventors: Pratap Dande, Saint Johns, FL (US); Naga Vamsi Krishna Akkapeddi, Charlotte, NC (US); Sakshi Bakshi, New Delhi (IN); Elvis Nyamwange, Fate, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 41 days.

(21) Appl. No.: 18/946,824

(22) Filed: Nov. 13, 2024

(65) Prior Publication Data

US 2026/0133864 A1 May 14, 2026

(51) Int. Cl.
*G06F 11/00* (2006.01)
*G06F 11/07* (2006.01)

(52) U.S. Cl.
CPC ...... *G06F 11/0751* (2013.01); *G06F 11/0793* (2013.01)

(58) Field of Classification Search
CPC ............. G06F 11/0751; G06F 11/0793; G06F 11/079; G06F 11/0766
See application file for complete search history.

(56) References Cited

U.S. PATENT DOCUMENTS 12,113,686 B2 * 10/2024 Juneja ..................... H04L 43/16
2018/0219889 A1 * 8/2018 Oliner ................. H04L 63/1425
2021/0281492 A1 * 9/2021 Di Pietro ............ H04L 41/0631
2022/0044763 A1 * 2/2022 Karimi ................... G16B 15/10
2022/0383135 A1 * 12/2022 Singh ................... G06N 3/0442
2025/0168056 A1 * 5/2025 Lasso .................... H04L 41/142

OTHER PUBLICATIONS

Zeng et al., "Towards Intelligent Attack Detection Using DNA computing", ACM Transactions on Multimedia Computing, Communications and Applications, vol. 19, Issue 3s, Jun. 2023 (Year: 2023).*

* cited by examiner

*Primary Examiner* — Joseph D Manoskey
(74) *Attorney, Agent, or Firm* — Moore & Van Allen PLLC; Anoohya Yarlagadda

(57) ABSTRACT

Embodiments of the present invention provide a system for detecting real-time anomalies in transmission path of resources within an entity network via DNA computing. The system is configured for determining that an application received a resource from a source system to be transmitted to an end application via an entity network, extracting metadata from the resource, wherein the metadata is in a binary format, converting the metadata in the binary format to a DNA format, generating predicted molecular sequence associated with predicted transmission path of the resource within the entity network based on the DNA format of the metadata, monitoring real-time transmission path of the resource, generating real-time molecular sequence associated with the real-time transmission path of the resource, comparing the predicted molecular sequence with the real-time molecular sequence to determine an anomaly, and transmitting alerts associated with the anomaly.

20 Claims, 6 Drawing Sheets

SYSTEM AND METHOD FOR DETECTING REAL-TIME ANOMALIES IN TRANSMISSION PATH OF RESOURCES WITHIN AN ENTITY NETWORK VIA DNA COMPUTING

BACKGROUND

There exists a need for a system for detecting real-time anomalies in transmission path of resources within an entity network via DNA computing.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for detecting real-time anomalies in transmission path of resources within an entity network via DNA computing. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a first application received a resource from a source system to be transmitted to an end application via an entity network associated with an entity, extracts metadata from the resource via a machine learning model, wherein the metadata is in a binary format, converts the metadata in the binary format to a DNA format, generates predicted molecular sequence associated with predicted transmission path of the resource within the entity network based on the DNA format of the metadata, continuously monitors real-time transmission path of the resource, dynamically generates real-time molecular sequence associated with the real-time transmission path of the resource, continuously compares the predicted molecular sequence with the real-time molecular sequence, determines an anomaly based on comparing the predicted molecular sequence with the real-time molecular sequence in real-time, in response to determining the anomaly, validates the anomaly, determines that the validation of the anomaly is successful, and transmits one or more alerts associated with the anomaly based on determining that the validation of the anomaly is successful.

In some embodiments, the present invention performs one or more remediation steps to correct the anomaly.

In some embodiments, the present invention validates the anomaly based on one or more rules.

In some embodiments, the present invention determines that the resource is transmitted to the end application and purges the predicted molecular sequence and the real-time molecular sequence.

In some embodiments, the present invention stores the predicted molecular sequence and the real-time molecular sequence associated with the anomaly in a data repository before purging the predicted molecular sequence and the real-time molecular sequence.

In some embodiments, generating the predicted molecular sequence associated with the predicted transmission path of the resource within the entity network based on the DNA format of the metadata comprises performing sequence mapping of the metadata in the DNA format, identifying patterns associated with the resource from the DNA format of the metadata, and determining static variables in the DNA format of the metadata.

In some embodiments, the present invention the DNA format comprises the static variables and dynamic variables associated with transmission of the resource to the end application.

In some embodiments, dynamically generating the real-time molecular sequence associated with the real-time transmission path of the resource is based on the dynamic variables that change based on the real-time transmission path of the resource within the entity network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
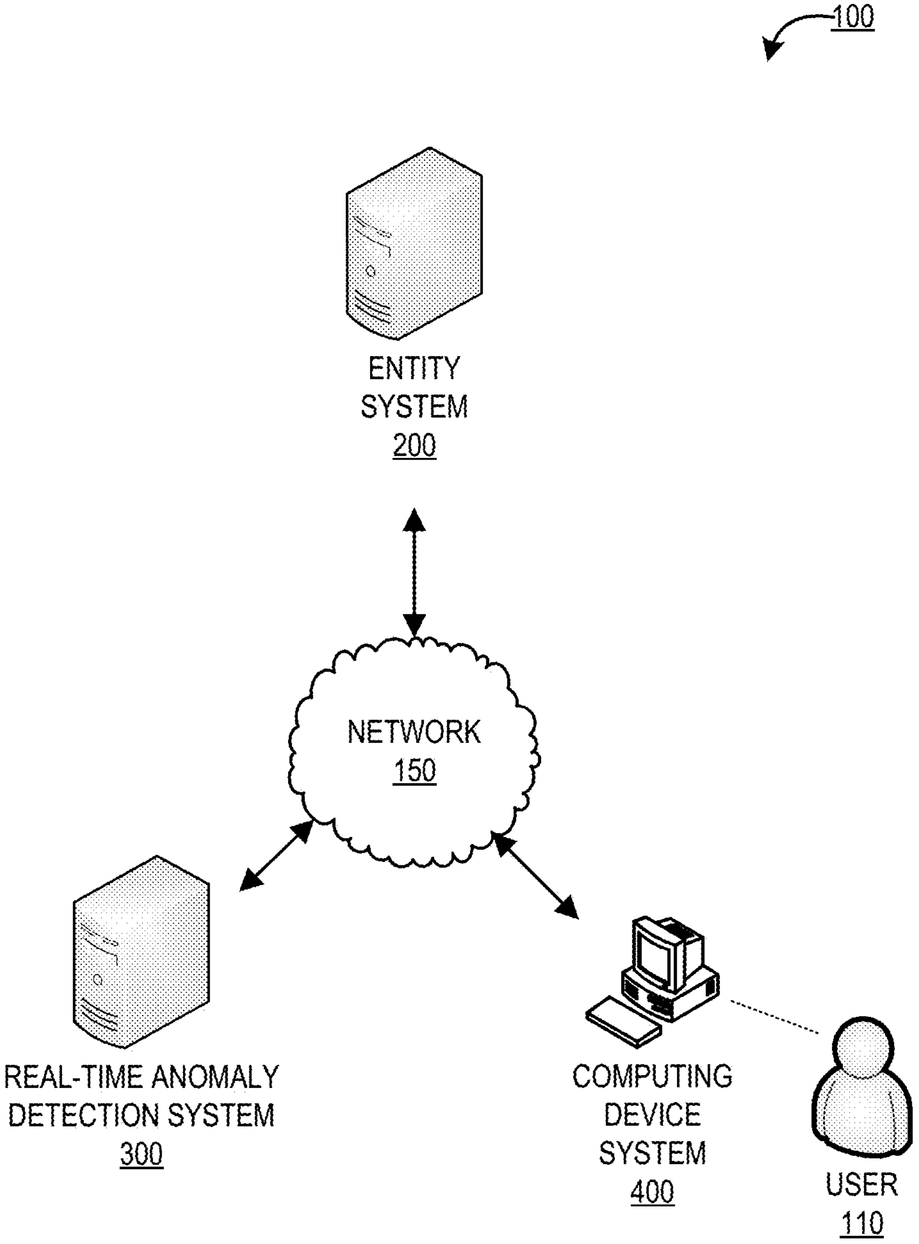
Figure 2:
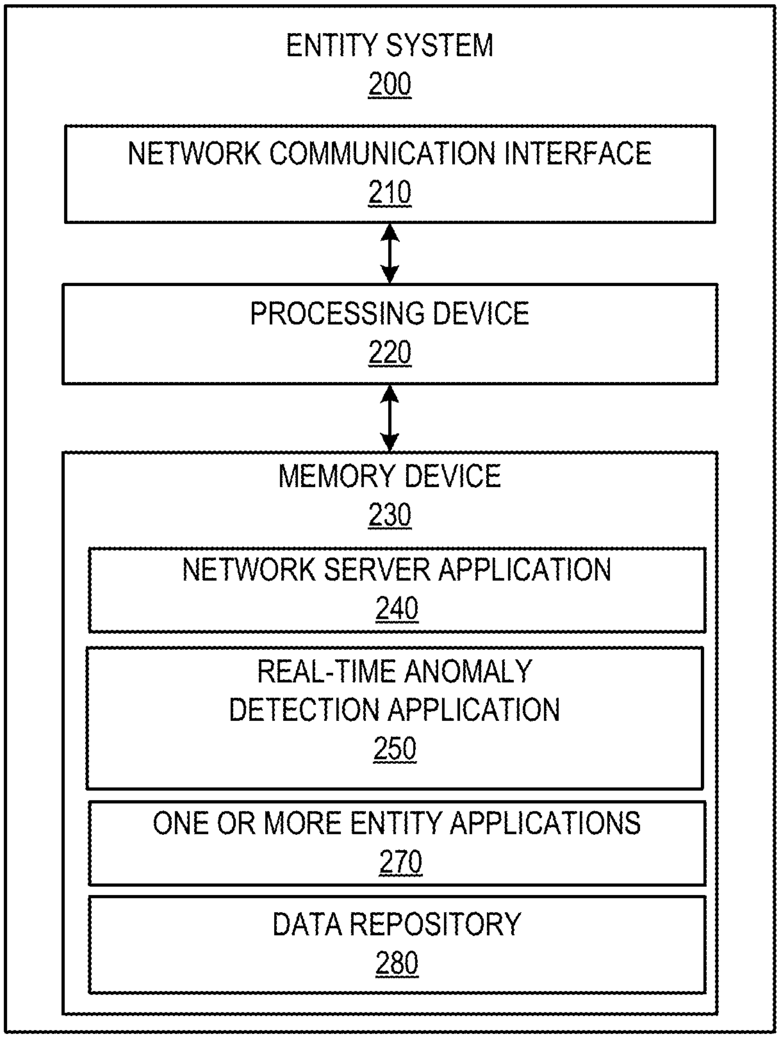
Figure 3:
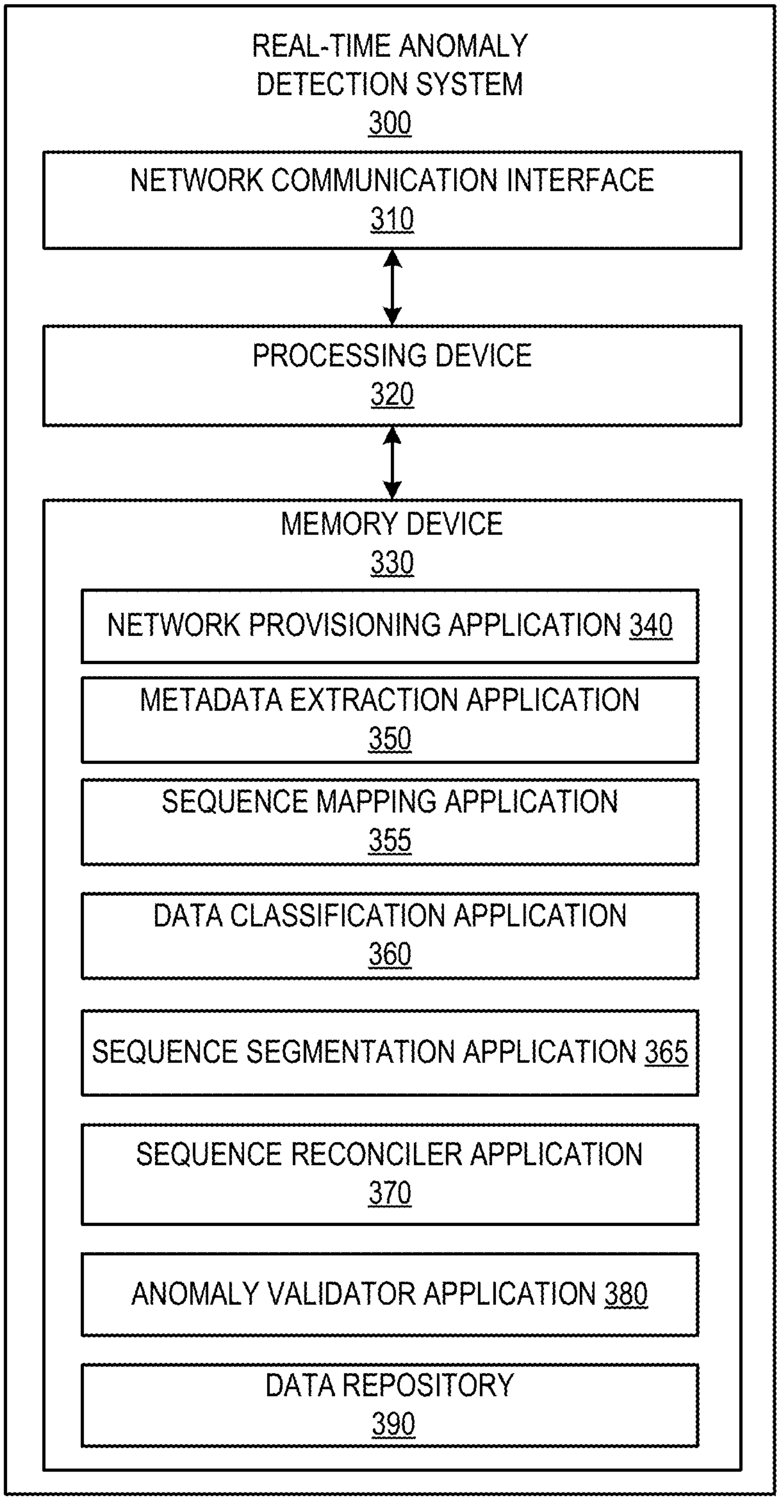
Figure 4:
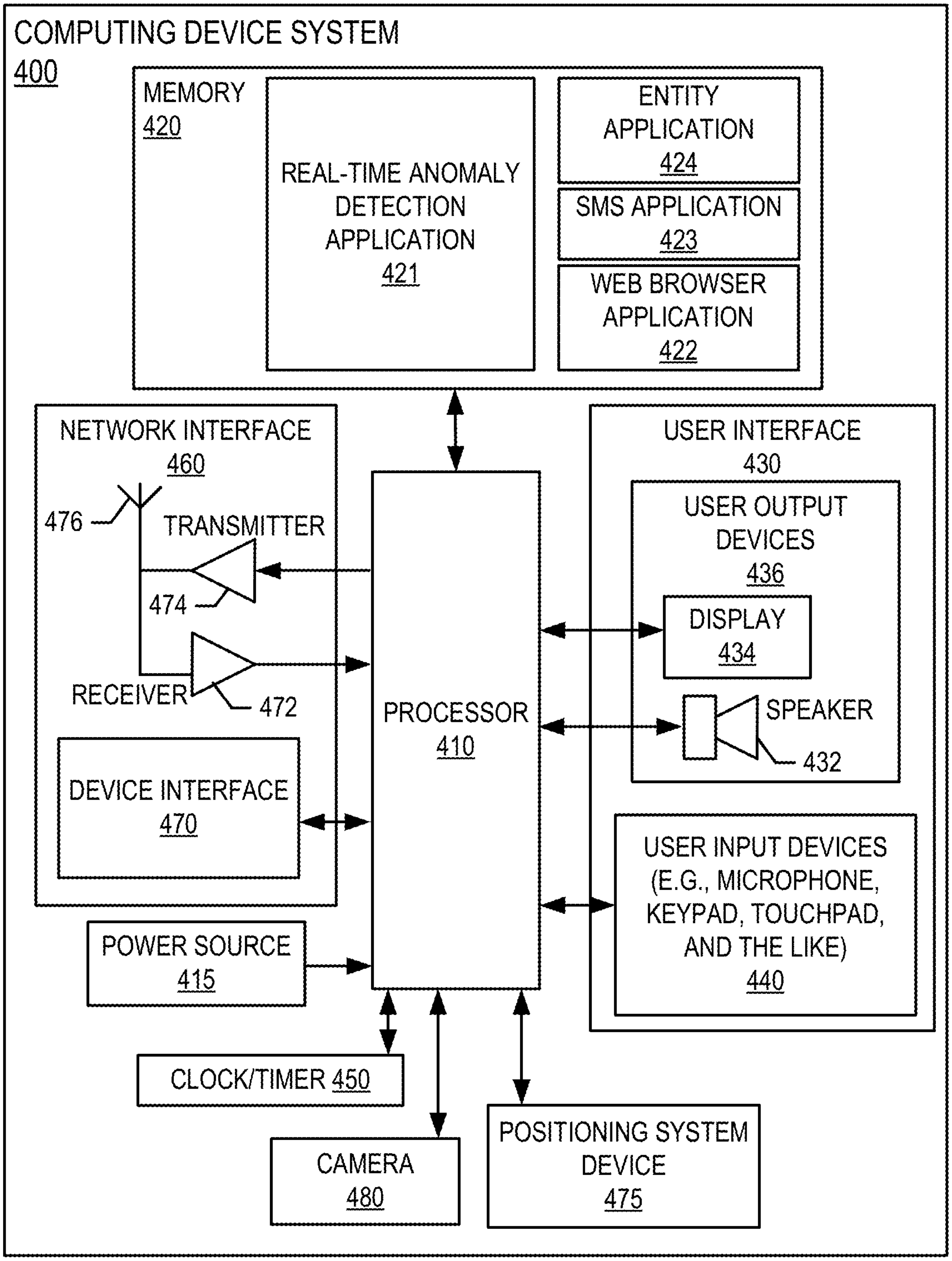
Figure 5A:
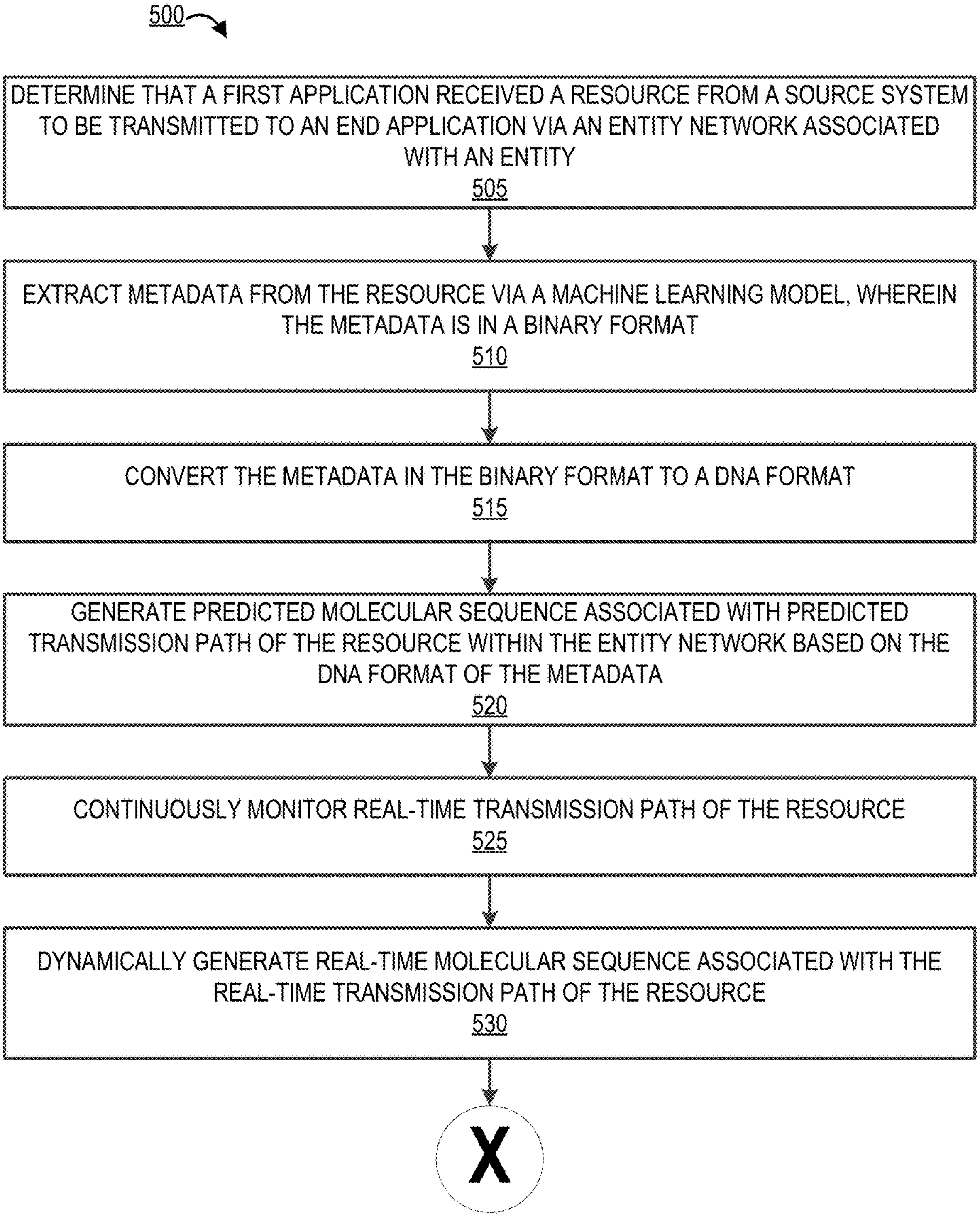
Figure 5B:
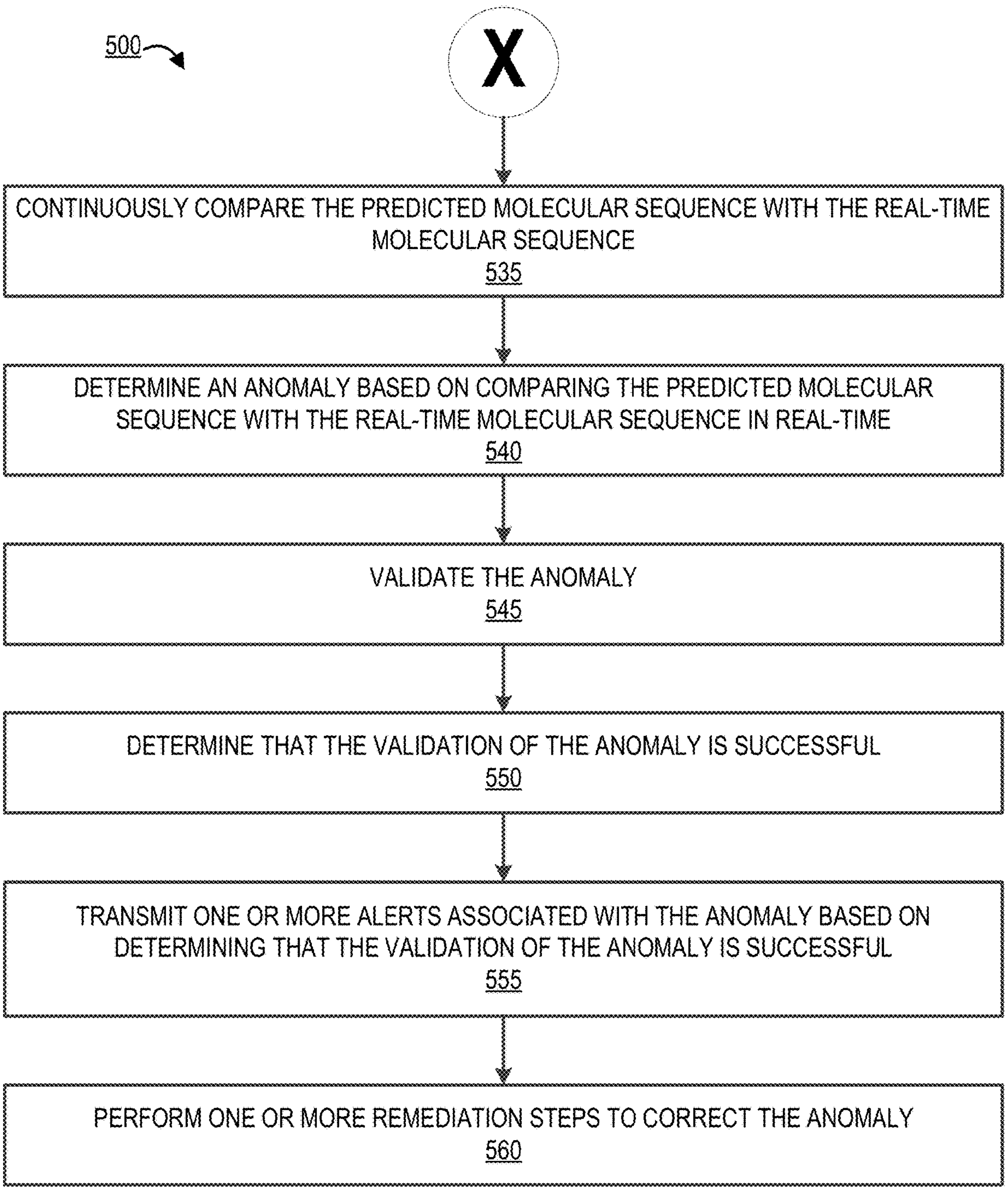

Having thus described embodiments of the invention in general terms, reference will now be made the accompanying drawings, wherein:

FIG. 1 provides a block diagram illustrating a system environment for detecting real-time anomalies in transmission path of resources within an entity network via DNA computing, in accordance with an embodiment of the invention;

FIG. 2 provides a block diagram illustrating the entity system 200 of FIG. 1, in accordance with an embodiment of the invention;

FIG. 3 provides a block diagram illustrating a real-time anomaly detection system 300 of FIG. 1, in accordance with an embodiment of the invention;

FIG. 4 provides a block diagram illustrating the computing device system 400 of FIG. 1, in accordance with an embodiment of the invention; and FIGS. 5A and 5B provide a process flow for detecting real-time anomalies in transmission path of resources within an entity network via DNA computing, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As described herein, the term “entity” may be any organization that uses one or more applications for performing one or more activities associated with the entities, where one or more data transmissions occur between the one or more applications. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution. As described herein, a “user” may be an employee, a customer, or a potential customer of the entity.

Many of the example embodiments and implementations described herein contemplate interactions engaged in by a user with a computing device and/or one or more communication devices and/or secondary communication devices. Furthermore, as used herein, the term “user computing device” or “mobile device” may refer to mobile phones, computing devices, tablet computers, wearable devices, smart devices and/or any portable electronic device capable of receiving and/or storing data therein.

A “user interface” is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, multiple applications are utilized by an entity to process different sections of data associated with a service provided by the entity. When a section of data is passed to an application that cannot understand that section of data, processing of that section of data is halted or terminated. Furthermore, there are some regulatory rules in place that may prevent a section of data from going to one or more applications, one or more systems, one or more geographical locations, and/or the like. Therefore, it is important to track transmission path of data within an entity network to avoid processing of data from being terminated and also to comply with the regulatory rules. Current conventional systems do not have the capability to identify anomalies associated with transmission path of resources in real-time. As such, there exists a need for a system that detects real-time anomalies in transmission path of resource within the entity network. The system of the present invention solves this problem as discussed in detail below.

FIG. 1 provides a block diagram illustrating a system environment 100 for detecting real-time anomalies in transmission path of resources within an entity network via DNA computing, in accordance with an embodiment of the invention. As illustrated in FIG. 1, the environment 100 includes a real-time anomaly detection system 300, a network attached storage system 302, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be employees (e.g., full time employees, part-time employees, contractors, sub-contractors, and/or the like) of the entity associated with the entity system 200.

The entity system(s) 200 may be any system owned or otherwise controlled by an entity to support or perform one or more process steps described herein. In some embodiments, the entity may be any organization that uses one or more applications for performing one or more activities associated with the entities, where one or more data transmissions occur between the one or more applications. In some embodiments, the entity is a non-financial institution.

The real-time anomaly detection system 300 is a system of the present invention for performing one or more process steps described herein. In some embodiments, the real-time anomaly detection system 300 may be an independent system. In some embodiments, the real-time anomaly detection system 300 may be a part of the entity system 200. In some embodiments, the real-time anomaly detection system 300 may be controlled, owned, managed, and/or maintained by the entity associated with the entity system 200.

The real-time anomaly detection system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the real-time anomaly detection system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the real-time anomaly detection system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a real-time anomaly detection application 250, one or more entity applications 270, and a data repository 280. The one or more entity applications 270 may be any applications developed, supported, maintained, utilized, and/or controlled by the entity. The computer-executable program code of the network server application 240, the real-time anomaly detection application 250, the one or more entity application 270 to perform certain logic, data-extraction, and data-storing functions of the entity system 200 described herein, as well as communication functions of the entity system 200.

The network server application 240, the real-time anomaly detection application 250, and the one or more entity applications 270 are configured to store data in the data repository 280 or to use the data stored in the data repository 280 when communicating through the network communication interface 210 with the real-time anomaly detection system 300, and/or the computing device system 400 to perform one or more process steps described herein. In some embodiments, the entity system 200 may receive instructions from the real-time anomaly detection system 300 via the real-time anomaly detection application 250 to perform certain operations. The real-time anomaly detection application 250 may be provided by the real-time anomaly detection system 300. The one or more entity applications 270 may be any of the applications used, created, modified, facilitated, developed, and/or managed by the entity system 200.

FIG. 3 provides a block diagram illustrating the real-time anomaly detection system 300 in greater detail, in accordance with embodiments of the invention. As illustrated in FIG. 3, in one embodiment of the invention, the real-time anomaly detection system 300 includes one or more processing devices 320 operatively coupled to a network communication interface 310 and a memory device 330. In certain embodiments, the real-time anomaly detection system 300 is operated by an entity, such as a financial institution. In some embodiments, the real-time anomaly detection system 300 is owned or operated by the entity of the entity system 200. In some embodiments, the real-time anomaly detection system 300 may be an independent system. In alternate embodiments, the real-time anomaly detection system 300 may be a part of the entity system 200.

It should be understood that the memory device 330 may include one or more databases or other data structures/repositories. The memory device 330 also includes computer-executable program code that instructs the processing device 320 to perform processing operations described herein and to operate the network communication interface 310 to perform certain communication functions of the real-time anomaly detection system 300. For example, in one embodiment of the real-time anomaly detection system 300, the memory device 330 includes, but is not limited to, a network provisioning application 340, a metadata extraction application 350, a sequence mapping application 355, a data classification application 360, a sequence segmentation application 365, a sequence reconciler application 370, an anomaly validator application 380, and a data repository 390 comprising any data processed or accessed by one or more applications in the memory device 330. The computer-executable program code of the network provisioning application 340, the metadata extraction application 350, the sequence mapping application 355, the data classification application 360, the sequence segmentation application 365, the sequence reconciler application 370, and the anomaly validator application 380 may instruct the processing device 320 to perform certain logic, data-processing, and data-storing functions of the real-time anomaly detection system 300 described herein, as well as communication functions of the real-time anomaly detection system 300.

The network provisioning application 340, the metadata extraction application 350, the sequence mapping application 355, the data classification application 360, the sequence segmentation application 365, the sequence reconciler application 370, and the anomaly validator application 380 are configured to invoke or use the data in the data repository 390 when communicating through the network communication interface 310 with the entity system 200, and/or the computing device system 400. In some embodiments, the network provisioning application 340, the metadata extraction application 350, the sequence mapping application 355, the data classification application 360, the sequence segmentation application 365, the sequence reconciler application 370, and the anomaly validator application 380 may store the data extracted or received from the entity system 200, and the computing device system 400 in the data repository 390. In some embodiments, the network provisioning application 340, the metadata extraction application 350, the sequence mapping application 355, the data classification application 360, the sequence segmentation application 365, the sequence reconciler application 370, and the anomaly validator application 380 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a real-time anomaly detection application 421, entity application 424. These applications also typically instructions to a graphical user interface (GUI) on the display 430 that allows the user 110 to interact with the entity system 200, the real-time anomaly detection system 300, and/or other devices or systems. The memory 420 of the computing device system 400 may comprise a Short Message Service (SMS) application 423 configured to send, receive, and store data, information, communications, alerts, and the like via the network 150. In some embodiments, the real-time anomaly detection application 421 provided by the real-time anomaly detection system 300 allows the user 110 to access the real-time anomaly detection system 300. In some embodiments, the entity application 424 provided by the entity system 200 and the real-time anomaly detection application 421 allow the user 110 to access the functionalities provided by the real-time anomaly detection system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIGS. 5A and 5B provide a process flow for detecting real-time anomalies in transmission path of resources within an entity network via DNA computing, in accordance with an embodiment of the invention. As shown in block 505, the system determines that a first application received a resource from a source system to be transmitted to an end application via an entity network associated with an entity. The resource data may comprise data associated with a service provided by the first application, end application, and other applications associated with the entity. For example, where the entity is a financial institution, a plurality of applications may process data associated with a mortgage application, where one application may be associated with receiving any type of information associated with a mortgage application, another application may be associated with processing financial information associated with the application, another application may be associated with process property related information, another application associated with approving the mortgage application, and/or the like.

As shown in block 510, the system extracts metadata from the resource via a machine learning model, wherein the metadata is in a binary format. The metadata may comprise information associated with the origination of the resource, destination of the resource, size of the resource, and/or the like.

As shown in block 515, the system converts the metadata in the binary format to a DNA format. The system may use a converter to convert the metadata from binary format to the DNA format such that the metadata is understood by DNA processing models that are used in the steps below for generating molecular sequences. An example of such a converter is an Adaptive DNA Storage Codec (ADS Codex).

As shown in block 520, the system generates predicted molecular sequence associated with predicted transmission path of the resource within the entity network based on the DNA format of the metadata. Generating the predicted molecular sequence associated with the predicted transmission path of the resource within the entity network based on the DNA format of the metadata comprises performing sequence mapping of the metadata in the DNA format, identifying patterns associated with the resource from the DNA format of the metadata, and determining static variables in the DNA format of the metadata. In some embodiments, the system may perform sequence mapping, via a DNA sequence mapping application (e.g., the sequence mapping application 355). Performing sequence mapping of the metadata in the DNA format arranges data in the resource such that it is meaningful and understood by the one or more applications. In some embodiments, the system may use the data classification application 360 comprising machine learning models to classify data segments in the metadata of the resource and identify patterns. Identifying patterns associated with the resource from the DNA format of the metadata is based on classifying data in the resource based on one or more parameters comprising nature of resource, resource status, source, destination, and/or the like. Determining static variables in the DNA format of the metadata comprising identifying static variables comprising infrastructure details including but not limited to processing power, memory utilization, and/or the like associated with transmission and processing of the resource. In some embodiments, the system stores the static variables in a data repository. In some embodiments, the system generates the predicted molecular sequence based on creating segments of the predicted molecular sequence, via the sequence segmentation application 365, which comprises arranging data in the resource to qualify as discrete sections (e.g., certain blocks of data can be grouped together if the resource is an invoice) and identifying characteristics in the discrete sections (e.g., zero dollar invoice is used to correct line items so that line items can be posted to correct general ledger account) to aid in predicting the course of flow of resource within the entity network, where the generated predicted molecular sequence is based on the course of flow of the resource.

As shown in block 525, the system continuously monitors real-time transmission path of the resource. As shown in block 530, the system dynamically generates real-time molecular sequence associated with the real-time transmission path of the resource. The real-time molecular sequence is based on a real-time transmission path of the resource.

As shown in block 535, the system continuously compares the predicted molecular sequence with the real-time molecular sequence, via the sequence reconciler application 370. As shown in block 540, the system, via the sequence reconciler application 370, determines an anomaly based on comparing the predicted molecular sequence with the real-time molecular sequence in real-time. In some embodiments, the system may identify a spike in the real-time molecular sequence based on comparing the predicted molecular sequence with the real-time molecular sequence and identify the spike in the real-time molecular sequence as an anomaly.

As shown in block 545, the system validates the anomaly, via the anomaly validator application 380. The system may validate the anomaly based on one or more rules and existing information associated with similar anomalies. In some embodiments, the system may validate the anomaly based on an input from a user. As shown in block 550, the system determines that the validation of the anomaly is successful. In some embodiments, the system may convert the metadata of the resource which is in the DNA format back to the binary format via the converter disclosed in block 515.

As shown in block 555, the system transmits one or more alerts associated with the anomaly based on determining that the validation of the anomaly is successful. The one or more alerts may be transmitted to one or more users associated with the applications processing the resource. As shown in block 560, the system performs one or more remediation steps to correct the anomaly. In some embodiments, the one or more remediation steps may be implemented automatically to correct the anomaly. In some embodiments, the one or more remediation steps may be based on input from the one or more users. In some embodiments, the system may utilize special hardware for performing one or more steps related to DNA computing that are described herein. The special hardware may comprise molecular biology hardware. Examples of the special hardware may comprise DNA computers, DNA chips, DNA tiles, DNA processors, logic gates, etc. The system utilizes DNA computing to improve the functionality of detecting real-time anomalies by performing parallel processing to perform multiple operations simultaneously across many DNA strands which allows for solving complex problems quickly and efficiently. Additionally, utilizing DNA computing also allows for storing massive amount of data.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for detecting real-time anomalies in transmission path of resources within an entity network via DNA computing, the system comprising:
- at least one network communication interface;
- at least one non-transitory storage device; and
- at least one processing device coupled to the at least one non-transitory storage device and the at least one network communication interface, wherein the at least one processing device is configured to:
  - determine that a first application received a resource from a source system to be transmitted to an end application via an entity network associated with an entity;
  - extract metadata from the resource via a machine learning model, wherein the metadata is in a binary format;
  - convert the metadata in the binary format to a DNA format;
  - generate predicted molecular sequence associated with predicted transmission path of the resource within the entity network based on the DNA format of the metadata by:
    - performing sequence mapping of the metadata in the DNA format;
    - identifying patterns associated with the resource from the DNA format of the metadata; and
    - determining static variables in the DNA format of the metadata;
  - continuously monitor real-time transmission path of the resource;

dynamically generate real-time molecular sequence associated with the real-time transmission path of the resource;

continuously compare the predicted molecular sequence with the real-time molecular sequence;

determine an anomaly based on comparing the predicted molecular sequence with the real-time molecular sequence in real-time;

in response to determining the anomaly, validate the anomaly;

determine that the validation of the anomaly is successful; and transmit one or more alerts associated with the anomaly based on determining that the validation of the anomaly is successful.

2. The system of claim 1, wherein the at least one processing device is configured to perform one or more remediation steps to correct the anomaly.

3. The system of claim 1, wherein the at least one processing device is configured to validate the anomaly based on one or more rules.

4. The system of claim 1, wherein the at least one processing device is configured to:

determine that the resource is transmitted to the end application; and purge the predicted molecular sequence and the real-time molecular sequence.

5. The system of claim 4, wherein the at least one processing device is configured to store the predicted molecular sequence and the real-time molecular sequence associated with the anomaly in a data repository before purging the predicted molecular sequence and the real-time molecular sequence.

6. The system of claim 1, wherein the DNA format comprises the static variables and dynamic variables associated with transmission of the resource to the end application.

7. The system of claim 6, wherein dynamically generating the real-time molecular sequence associated with the real-time transmission path of the resource is based on the dynamic variables that change based on the real-time transmission path of the resource within the entity network.

8. A computer program product for detecting real-time anomalies in transmission path of resources within an entity network via DNA computing, the computer program product comprising a non-transitory computer-readable storage medium having computer executable instructions for causing a computer processor to perform the steps of:

determining that a first application received a resource from a source system to be transmitted to an end application via an entity network associated with an entity;

extracting metadata from the resource via a machine learning model, wherein the metadata is in a binary format;

converting the metadata in the binary format to a DNA format;

generating predicted molecular sequence associated with predicted transmission path of the resource within the entity network based on the DNA format of the metadata by:

performing sequence mapping of the metadata in the DNA format;

identifying patterns associated with the resource from the DNA format of the metadata; and determining static variables in the DNA format of the metadata;

continuously monitoring real-time transmission path of the resource;

dynamically generating real-time molecular sequence associated with the real-time transmission path of the resource;

continuously comparing the predicted molecular sequence with the real-time molecular sequence;

determining an anomaly based on comparing the predicted molecular sequence with the real-time molecular sequence in real-time;

in response to determining the anomaly, validating the anomaly;

determining that the validation of the anomaly is successful; and transmitting one or more alerts associated with the anomaly based on determining that the validation of the anomaly is successful.

9. The computer program product of claim 8, wherein the computer executable instructions cause the computer processor to perform the step of performing one or more remediation steps to correct the anomaly.

10. The computer program product of claim 8, wherein the computer executable instructions cause the computer processor to perform the step of validating the anomaly based on one or more rules.

11. The computer program product of claim 8, wherein the computer executable instructions cause the computer processor to perform the steps of:

determining that the resource is transmitted to the end application; and purging the predicted molecular sequence and the real-time molecular sequence.

12. The computer program product of claim 11, wherein the computer executable instructions cause the computer processor to perform the step of storing the predicted molecular sequence and the real-time molecular sequence associated with the anomaly in a data repository before purging the predicted molecular sequence and the real-time molecular sequence.

13. The computer program product of claim 8, wherein the DNA format comprises the static variables and dynamic variables associated with transmission of the resource to the end application.

14. A computer implemented method for detecting real-time anomalies in transmission path of resources within an entity network via DNA computing, wherein the method comprises:

determining that a first application received a resource from a source system to be transmitted to an end application via an entity network associated with an entity;

extracting metadata from the resource via a machine learning model, wherein the metadata is in a binary format;

converting the metadata in the binary format to a DNA format;

generating predicted molecular sequence associated with predicted transmission path of the resource within the entity network based on the DNA format of the metadata by:

performing sequence mapping of the metadata in the DNA format;

identifying patterns associated with the resource from the DNA format of the metadata; and determining static variables in the DNA format of the metadata;

continuously monitoring real-time transmission path of the resource;

dynamically generating real-time molecular sequence associated with the real-time transmission path of the resource;

continuously comparing the predicted molecular sequence with the real-time molecular sequence;

determining an anomaly based on comparing the predicted molecular sequence with the real-time molecular sequence in real-time;

in response to determining the anomaly, validating the anomaly;

determining that the validation of the anomaly is successful; and transmitting one or more alerts associated with the anomaly based on determining that the validation of the anomaly is successful.

15. The computer implemented method of claim 14, wherein the method comprises: performing one or more remediation steps to correct the anomaly.

16. The computer implemented method of claim 14, wherein the method comprises validating the anomaly based on one or more rules.

17. The computer implemented method of claim 14, wherein the method comprises:

determining that the resource is transmitted to the end application; and purging the predicted molecular sequence and the real-time molecular sequence.

18. The computer implemented method of claim 17, wherein the method comprises storing the predicted molecular sequence and the real-time molecular sequence associated with the anomaly in a data repository before purging the predicted molecular sequence and the real-time molecular sequence.

19. The computer implemented method of claim 14, wherein the DNA format comprises the static variables and dynamic variables associated with transmission of the resource to the end application.

20. The computer implemented method of claim 19, wherein dynamically generating the real-time molecular sequence associated with the real-time transmission path of the resource is based on the dynamic variables that change based on the real-time transmission path of the resource within the entity network.

* * * * *